(12) United States Patent
Muzila

(10) Patent No.: US 6,354,544 B1
(45) Date of Patent: Mar. 12, 2002

(54) ADJUSTABLE CAMERA MOUNTING DEVICE

(76) Inventor: Michael Muzila, 659 Dewitt Dr., Highland Heights, OH (US) 44143

( * ) Notice: Subject to any disclaimer, the term of this patent is extended or adjusted under 35 U.S.C. 154(b) by 0 days.

(21) Appl. No.: 09/513,790

(22) Filed: Feb. 25, 2000

(51) Int. Cl.⁷ ............................................. F16M 11/04
(52) U.S. Cl. ............................ 248/187.1; 248/177.1; 248/181.1; 248/183.3; 348/373; 352/243; 396/428
(58) Field of Search .......................... 248/183.2, 179.1, 248/278.1, 187.1, 279.1; 396/428, 422; 352/243; 348/373

(56) References Cited

U.S. PATENT DOCUMENTS

| | | | |
|---|---|---|---|
| 399,345 A | | 3/1889 | Poehlman |
| 2,922,609 A | | 1/1960 | Collier |
| 2,962,251 A | * | 11/1960 | Karpf ........................ 352/243 |
| 3,613,546 A | * | 10/1971 | Richardson ................. 396/428 |
| 3,661,376 A | * | 5/1972 | Hill et al. ................. 248/183.2 |
| 3,731,897 A | | 5/1973 | Price |
| 3,931,947 A | * | 1/1976 | Tagnon .................... 248/188.4 |
| 4,044,982 A | * | 8/1977 | Miller et al. .............. 248/183.2 |
| 4,108,412 A | * | 8/1978 | Miller et al. .............. 248/187.1 |
| 4,319,825 A | | 3/1982 | Newton |
| 4,653,709 A | | 3/1987 | Paldino |
| 5,768,648 A | * | 6/1998 | Skipp et al. ................ 396/428 |

* cited by examiner

Primary Examiner—Ramon O. Ramirez
Assistant Examiner—Tan Le
(74) Attorney, Agent, or Firm—James A. Hudak

(57) ABSTRACT

An adjustable camera mounting device or bracket is disclosed. The camera mounting device includes a base member having a curved recess portion which receives a camera mounting member having a complementary curved configuration. A spring-biased pressure member and oppositely positioned guide members are mounted within the curved recess portion of the base member and are received within a complementary groove in the camera mounting member permitting the camera mounting member to be rotatably movable within the base member. Spaced-apart pressure members provided within the base member apply a compressive force to the camera mounting member permitting the camera mounting member to be rotatable within the curved recess portion of the base member and to be grippingly retained after the desired orientation of the camera has been attained.

16 Claims, 3 Drawing Sheets

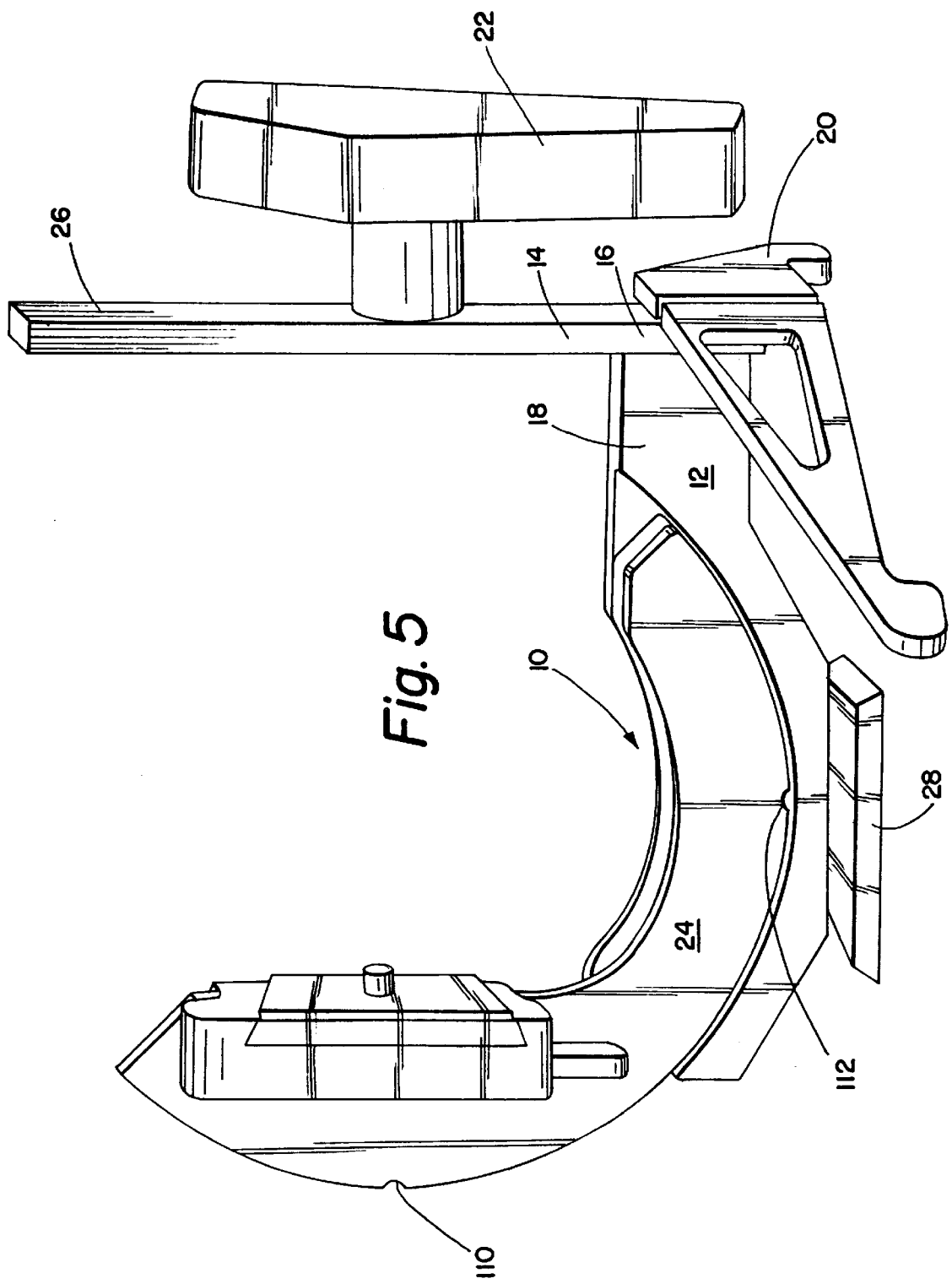

ADJUSTABLE CAMERA MOUNTING DEVICE

TECHNICAL FIELD

The present invention relates, in general, to an adjustable camera mounting device and, more particularly, to an adjustable camera mounting device that permits the infinite rotational adjustment of the orientation of a camera between the horizontal and vertical positions and vice versa.

BACKGROUND ART

Both amateur and professional photographers have occasion to rotate their cameras from a horizontal position to a vertical position or any position therebetween to obtain the desired photograph of the subject matter. While this typically creates no physical problems for the photographer, such camera rotation usually results in the rotation of the associated flash unit that is either physically attached to the camera or to a bracket that is attached to the camera. When the angular orientation of the flash unit is changed, side shadows, which are undesirable, may be introduced into the resulting photograph. It should be noted that shadows behind the subject are desirable and such shadows can be produced when the flash unit is above the subject, rather than to one side thereof. There are numerous devices or brackets available to hold or mount a camera in a specific orientation without changing the orientation of the flash unit. For example, U.S. Pat. No. 3,731,897 (Price) discloses a support for a camera wherein the angular position of the camera with respect to the support can be adjusted by means of a mounting screw which is received through an elongated slot within the support and which threadingly engages a mount in the base of the camera. A non-skid pad is provided on the top surface of the support to grippingly engage the base of the camera preventing its movement relative thereto after the mounting screw has been tightened. In this case, in order to change the angular position of the camera with respect to the support and the flash unit attached thereto, the mounting screw must be loosened, the camera must be moved relative to the support, and then the mounting screw must be tightened. This cumbersome operation can result in the camera being positioned slightly offset from the desired position since the tightening of the mounting screw can result in the camera moving slightly relative to the support. Thus, it is extremely difficult to obtain the exact desired position of the camera relative to this support using the device disclosed in this patent.

U.S. Pat. No. 4,319,825 (Newton) discloses a support for a camera and a flash unit that permits the camera to be rotated through 90 degrees while maintaining the flash unit in a fixed position above the subject. In this case, the support permits the camera to be rotated between two fixed positions that are 90 degrees apart, but does not permit the positioning of the camera between these two fixed positions. U.S. Pat. No. 2,922,609 (Collier) discloses an adjustable camera mount that utilizes a support member having a lower cylindrical surface that is received within a complementary circular depression provided within a disk attached to a base plate. Here gain, a screw member must be loosened to permit the support member to be rotated within the complementary circular depression to a desired position, and then the screw member must be tightened. As in the Price patent, the loosening of the screw member, rotation of the support member to the desired location, and then the tightening of the screw member can result in the position of the camera being slightly offset from its desired position.

Thus, it can be seen that numerous mounting devices and brackets are available permitting a camera to be rotatably adjustable without changing the orientation of the flash unit, however, the devices do not permit the accurate positioning of the camera within the device or relative to the mounting bracket. In view of the foregoing, it has become desirable to develop a camera mounting device which permits the infinite rotational adjustment of the camera with respect to same from the horizontal position to the vertical position and vice versa and such rotational adjustment can be achieved without changing the orientation of the flash unit. In addition, the camera mounting device should be self-adjusting to compensate for wear through use.

SUMMARY OF THE INVENTION

The present invention solves the problem associated with the prior art camera mounting devices or brackets by providing a camera mounting device that permits the infinite adjustment of a camera relative thereto from the horizontal position to the vertical position and vice versa without changing the orientation of the flash unit, and is self-adjusting to compensate for wear through use. The camera mounting device of the present invention includes a base member having a curved recess portion with a substantially circular configuration circumscribing an arc of about 120 degrees. A pressure member and associated biasing torsion springs, along with oppositely disposed conical guide members, are received within the curved recess portion of the base member. A camera mounting member is provided having a substantially circular configuration circumscribing an arc of approximately 180 degrees with a slightly smaller radius than the curved recess portion in base member. A groove having a truncated conical configuration is provided in the camera mounting member. The truncated conical configuration of the groove in the camera mounting member is complementary to the conical configuration of the guide members and the tip of the pressure member. The camera mounting member is rotatably received within the curved recess portion of the base member permitting the pressure member and the conical guide members to be received therein. Spaced-apart parallel curved pressure members are provided in pockets in the curved recess portion of the base member and apply a slidable gripping contact between the base member and the camera mounting member. The combination of the gripping engagement between the conical side surfaces of the guide members in the base member with the complementary side surfaces of the groove in the camera mounting member in conjunction with the slidable gripping contact between the camera mounting member and the spaced-apart parallel pressure members in the base member permit the camera mounting member to be rotatable within the base member and, after rotation, to be grippingly held in any position selected, thus permitting the infinite rotational positioning of the camera between horizontal and vertical positions, and vice versa, without changing the orientation of the flash unit.

BRIEF DESCRIPTION OF THE DRAWINGS

FIG. 5 is a perspective view of the adjustable camera mounting device of the present invention illustrating the orientation of the camera mounting member relative to the base member when the camera (not shown) is in the vertical position.

DESCRIPTION OF THE PREFERRED EMBODIMENT

Figure 1:
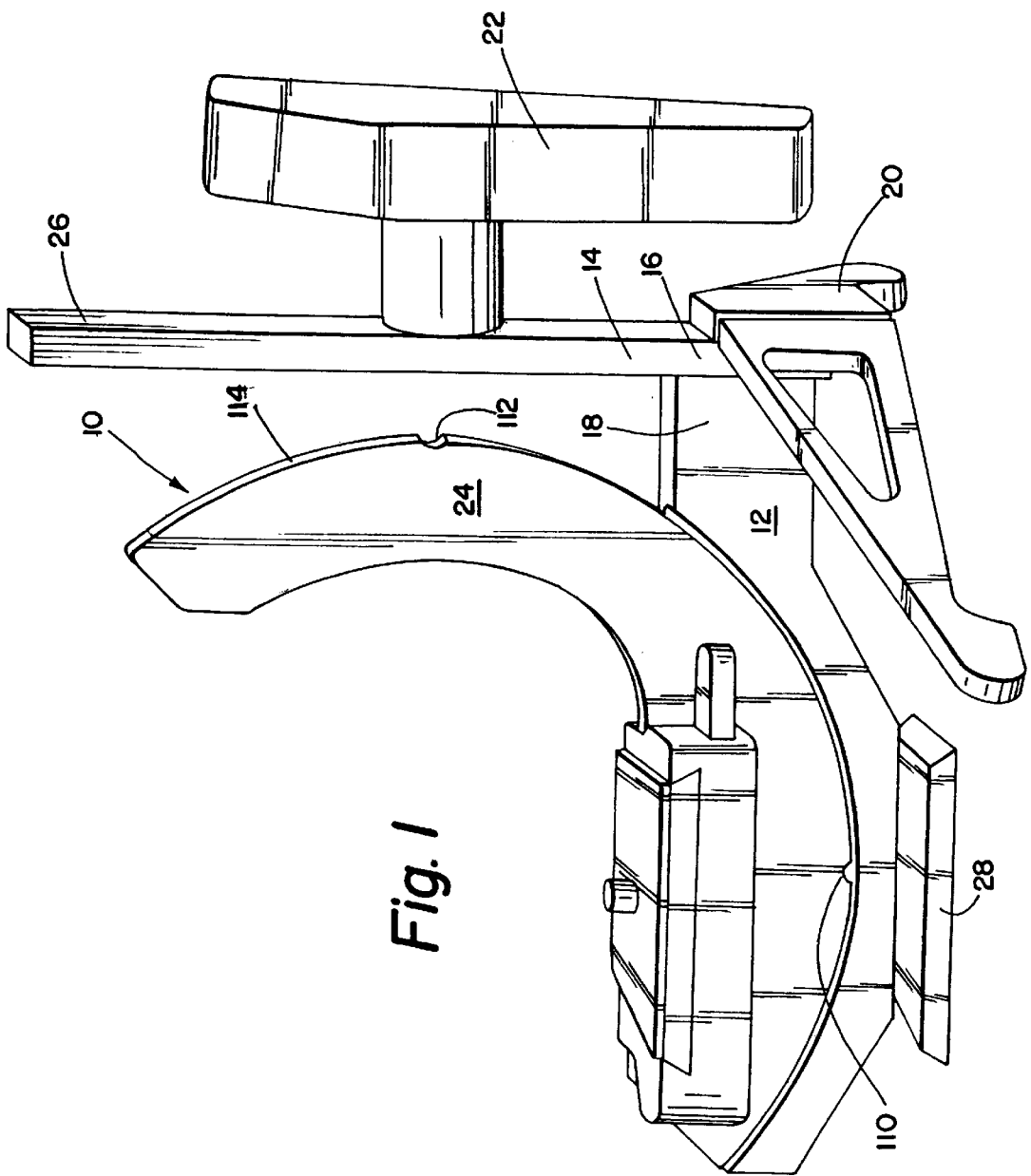
FIG. 1 is a perspective view of the adjustable camera mounting device of the present invention illustrating the orientation of the camera mounting member relative to the base member when the camera (not shown) is in the horizontal position.

Referring now to the Figures where the illustrations are for the purpose of describing the preferred embodiment of the present invention and are not intended to limit the invention described herein, FIG. 1 is a perspective view of the adjustable camera mounting device 10 of the present invention. The adjustable camera mounting device 10 includes a base member 12, an upright member 14 attached at one end 16 thereof to end 18 of the base member 12, a base stabilizing member 20 also attached to end 16 of upright member 14, a handle member 22 adjustably attached to upright member 14 and a camera mounting member 24 rotatably received within base member 12. A flash unit (not shown) is attachable to end 26 of upright member 14. Base stabilizing member 20 acts in conjunction with pad 28 attached to the bottom surface of base member 12 permitting the camera mounting device 10 to be placed on a horizontal surface (not shown). Pad 28 may be attached to a tripod (not shown), if desired.

Figure 2:
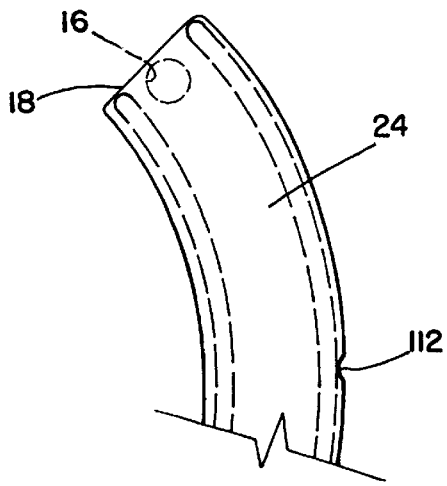
FIG. 2 is a front elevational view of the base member of the camera mounting device and a partial front elevational view of the camera mounting member of the present invention.
Figure 3:
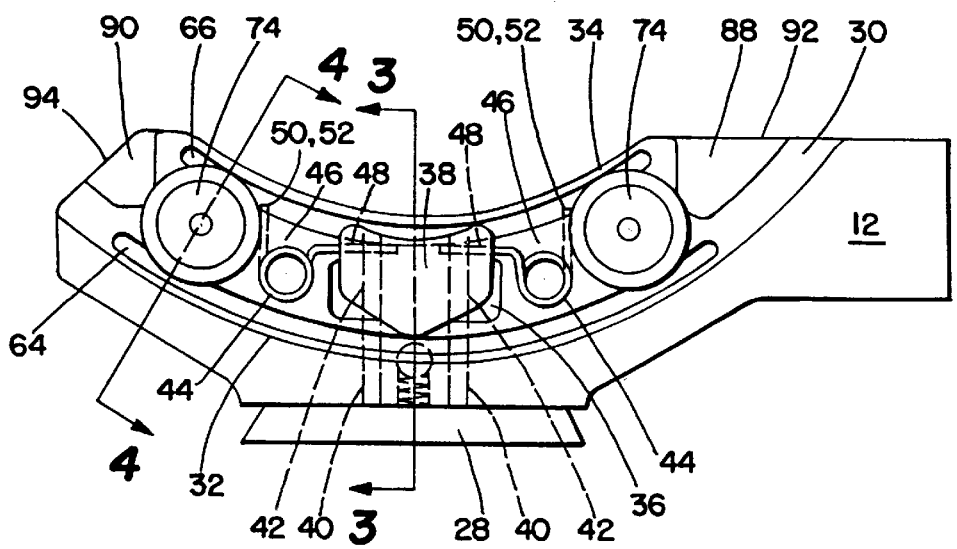
FIG. 3 is a cross-sectional view of the present invention taken across section-indicating lines 3—3 of FIG. 2.
Figure 3:
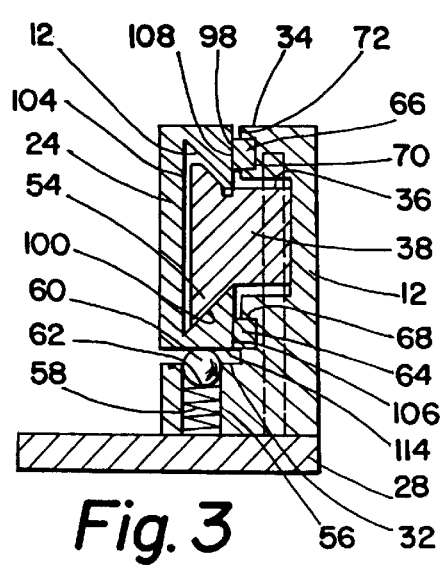

The base member 12 is typically made from a metallic material, such as aluminum, and includes a curved recess portion 30 having a substantially circular configuration that circumscribes an arc of about 120 degrees defined by outer curved surface 32 and inner curved surface 34, as shown in FIG. 2. A pocket 36 is provided in the approximate center of the curved recess portion 30. Pocket 36 receives a pressure member 38 formed from an ultra high molecular weight polyethylene material (UHMW-polymer), or the like. UHMW-polymer material is almost as slippery as Teflon and is approximately 5 times more wear resistant. Pressure member 38 is radially movable within pocket 36 on spaced-apart parallel pins 40, each pin 40 being received within a bore 42 provided in pressure member 38 and being secured in pocket 36 in base member 12. A torsion spring 44 is received within a pocket 46 provided in curved recess portion 30 and is positioned on either side of pressure member 38. One end 48 of each torsion spring 44 contacts the top surface of pressure member 38 so as to bias pressure member 38 toward outer curved surface 32 defining curved recess portion 30 of base member 12 while the other end 50 of each torsion spring 44 is received within a bore 52 in curved recess portion 30. Referring to FIG. 3, the tip portion 54 of pressure member 38 positioned exteriorly of pocket 36 has a conical configuration in cross-section. A spring 56 is received within a pocket 58 provided in base member 12 and is positioned so as to be substantially opposite to tip portion 54 of pressure member 38. A metallic ball 60 is positioned adjacent end 62 of spring 56 and is oppositely disposed to and is in a spaced-apart relationship with tip portion 54 of pressure member 38. Spaced-apart parallel curved pressure members 64, 66 made from Teflon, or the like, are received within complementary pockets 68, 70 provided in the surface 72 defining curved recess portion 30 of base member 12 and are positioned so that one pressure member 64 is adjacent outer curved surface 32 defining curved recess portion 30 and the other pressure member 66 is positioned adjacent inner curved surface 34 defining curved recess portion 30 of base member 12.

Figure 4:
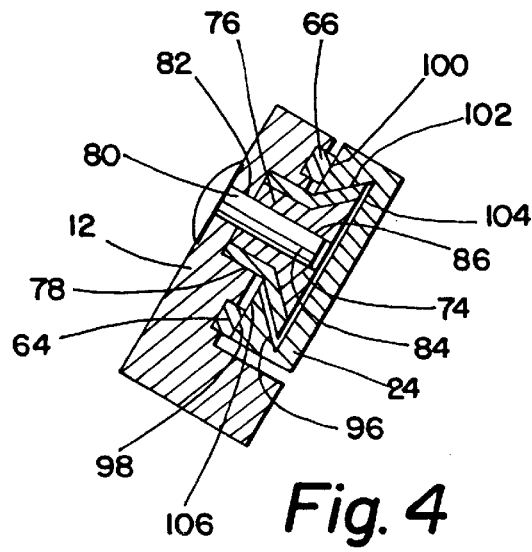
FIG. 4 is a cross-sectional view of the present invention taken across section-indicating lines 4—4 of FIG. 2.

Positioned outwardly of each torsion spring 44 is a guide member 74 having a truncated configuration in cross-section. Guide member 74 has a metallic hub 76 and is received within a pocket 78 in curved recess portion 30 of base member 12, as shown in FIG. 4. Each guide member 74 is made from UHMW-polymer material and is fixedly mounted within its associated pocket 78 by means of a bolt 80 received through an aperture 82 in curved recess portion 30 of base member 12. The end 84 of each bolt 80 is threadably received within a threaded bore 86 in hub 76 in guide member 74. Pockets 88, 90 are provided within surface 72 defining curved recess portion 30 of base member 12 and are positioned so as to be adjacent their respective ends 92, 94 of curved recess portion 30, as shown in FIG. 2.

Camera mounting member 24 is typically made from a metallic material, such as aluminum, and is substantially circular in configuration and circumscribes an arc of about 180 degrees having a slightly smaller radius than curved recess portion 30 of base member 12. The slightly smaller radius for the camera mounting member 24 compensates for wear between the camera mounting member 24 and the guide members 74. A circumferential groove 96 is provided within surface 98 of camera mounting member 24. Groove 96 has a truncated conical configuration complementary to the configuration of the conical configuration of the tip portion 54 of pressure member 38 and the conical configuration of the guide members 74, as shown in FIGS. 3 and 4. These complementary conical configurations permit the guide members 74 and the pressure member 38 to be received within groove 96 in camera mounting member 24 forming a dovetail arrangement therebetween and allow the camera mounting member 24 to be rotatably positioned within base member 12. When the camera mounting member 24 is positioned within the curved recess portion 30 of base member 12 such that the pressure member 38 and the guide members 74 are received within groove 96 in camera mounting member 24, the tip portion 54 of pressure member 38 grippingly contacts portion 100 of groove 96 and the conical side surfaces of the guide members 74 grippingly contact the complementary side surfaces 102 defining groove 96 causing the surfaces 106, 108 adjacent groove 96 in camera mounting member 24 to grippingly engage the spaced-apart parallel curved pressure members 64, 66, respectively, to provide a slidable gripping contact therebetween. The combination of the aforementioned gripping engagement between the conical side surfaces with the complementary side surfaces of the groove 96 in conjunction with the slidable gripping contact between surfaces 106, 108 on camera mounting member 24 and pressure members 64, 66, respectively, in base member 12 is such so as to permit camera mounting member 24 to be rotatable within base member 12 but, after rotation, to be grippingly held in the position selected, even if the position is such that the camera is oriented approximately 90 degrees with respect to vertical, as shown in FIG. 5. It should be noted that any wear to the tip portion 54 of pressure member 38, guide members 74, and spaced-apart curved pressure members 64, 66 is compensated for by the biasing action of springs 44 on pressure member 38. In essence, the camera mounting device 10 is self-adjusting. Detents 110, 112 positioned 90 degrees apart are provided in surface 114 of camera mounting member 24 for engagement with ball 60. Detents 110, 112 are positioned so as to engage ball 60 when the camera mounting member 24 is oriented so that the camera (not shown) is oriented horizontally or vertically, respectively. A pin 116 is provided adjacent end 118 of camera mounting member 24 and is received within pockets 88 or 90 in curved recess portion 30 of base member 12 and prevents the camera mounting member 24 from being rotated to the point where it would become disengaged from base member 12, thus preventing the camera mounting member 24 from being inadvertently removed from base member 12.

From the foregoing it is apparent that the camera mounting device 10 permits the infinite rotational adjustment of the camera with respect to same from the horizontal to the vertical position and vice versa. In addition, after the camera has been rotationally adjusted into the desired position, it is grippingly retained therein by the device 10. Furthermore, the infinite rotational adjustment of the camera can be achieved without changing the orientation of the flash unit. Lastly the camera mounting device is self-adjusting and compensates for wear through use.

Certain modifications and improvements will occur to those skilled in the art upon reading the foregoing. It is understood that such modifications and improvements have been deleted herein for the sake of conciseness and readability, but are properly within the scope of the following claims.

I claim:

1. An adjustable rotatable camera mounting device comprising a base member having a curved recess portion therein, a camera mounting member having a curved configuration and having a groove therein, said groove in said camera mounting member having a configuration substantially conforming to said curved configuration of said camera mounting member, a pressure member positioned within said curved recess portion in said base member and receivable in said groove in said camera mounting member so as to grippingly engage said groove in said camera mounting member when said camera mounting member is received within said curved recess portion of said base member.

2. The device as defined in claim 1 further including means for biasing said pressure member into gripping engagement with said camera mounting member.

3. The device as defined in claim 2 wherein said biasing means comprises at least one spring, said at least one spring being positioned outwardly of said pressure member and contacting said pressure member to bias same.

4. The device as defined in claim 3 further including at least one guide member, said at least one guide member being positioned outwardly of said at least one spring and being receivable within said groove in said camera mounting member.

5. The device as defined in claim 2 further including at least one guide member positioned within said curved recess portion in said base member, said at least one guide member being positioned outwardly of said pressure member and being receivable within said groove in said camera mounting member.

6. The device as defined in claim 1 further including means for mounting said pressure member, said mounting means permitting the radial movement of said pressure member in said curved recess portion of said base member.

7. The device as defined in claim 6 wherein said mounting means is receivable through said pressure member permitting said pressure member to be movable relative thereto.

8. The device as defined in claim 1 further including means for slidingly engaging the surface of said camera member, said sliding engaging means being provided in said curved recess portion of said base member.

9. The device as defined in claim 1 further including a base stabilizing member operably connected to said base member, said base stabilizing member cooperating with said base member allowing the device to be placed on a substantially flat surface.

10. The device as defined in claim 1 further including an upright member attached to said base member for attachment of a flash unit thereto.

11. The device as defined in claim 10 further including a handle member operably connected to said upright member.

12. An adjustable rotatable camera mounting device comprising a base member having a curved recess portion therein, a camera mounting member having a groove therein, a pressure member positioned within said curved recess portion in said base member and receivable in said groove in said camera mounting member so as to grippingly engage camera mounting member when said camera mounting member is received within said curved recess portion of said base member, and means for engaging said camera mounting member, said engaging means being received within said base member and comprising a ball member biased so as to engage the surface of said camera mounting member.

13. The device as defined in claim 12 wherein said biasing means comprises a spring which contacts said ball member.

14. The device as defined in claim 12 further including means for securing the position of said camera mounting member in said base member so that said camera mounting member is oriented in a specific position relative to said base member.

15. The device as defined in claim 14 wherein said securing means comprises at least one detent within said camera mounting member, said ball member engaging the surface defining said at least one detent when said camera mounting member is oriented in a specific position relative to said base member.

16. An adjustable rotatable camera mounting device comprising a base member having a curved recess portion therein, a camera mounting member having a groove therein, a pressure member positioned within said curved recess portion in said base member and receivable in said groove in said camera mounting member so as to grippingly engage said camera mounting member when said camera mounting member is received within said curved recess portion of said base member, a recess provided in said curved recess portion in said base member and a pin member attached to said camera mounting member, said pin member engaging said recess in said curved portion of said base member preventing said camera mounting member from being removed from said base member.

* * * * *